No. 864,562. PATENTED AUG. 27, 1907.
L. E. ROBY.
SEED DRILL.
APPLICATION FILED OCT. 22, 1904.
3 SHEETS—SHEET 1.
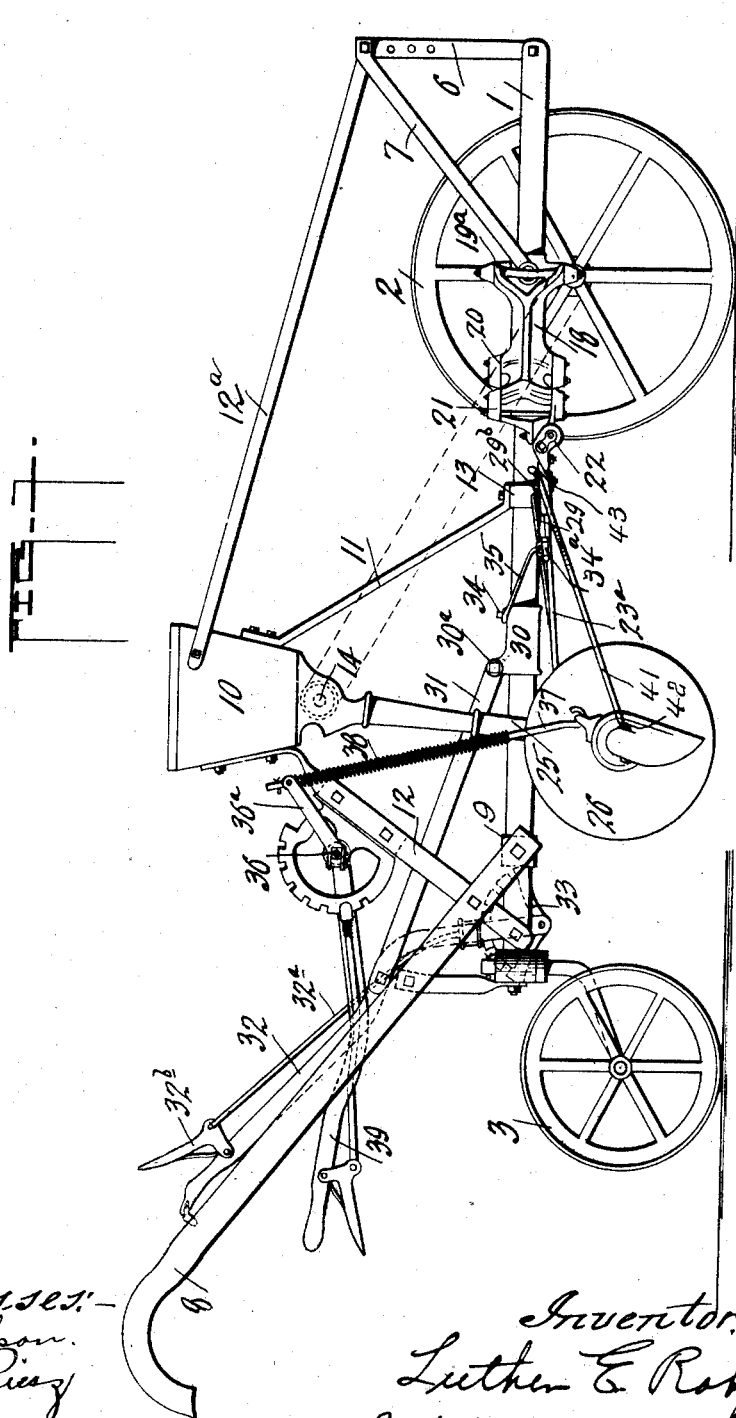

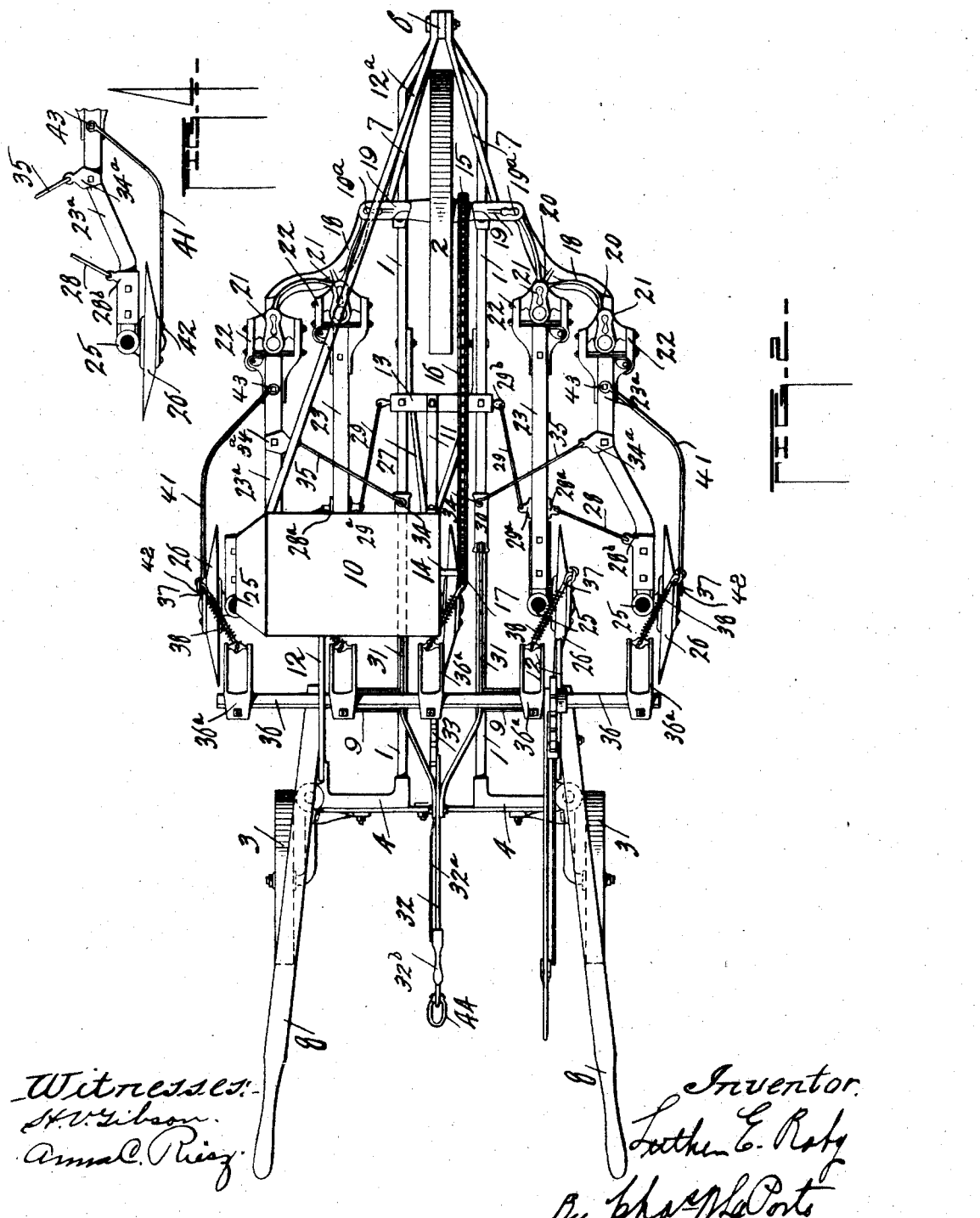

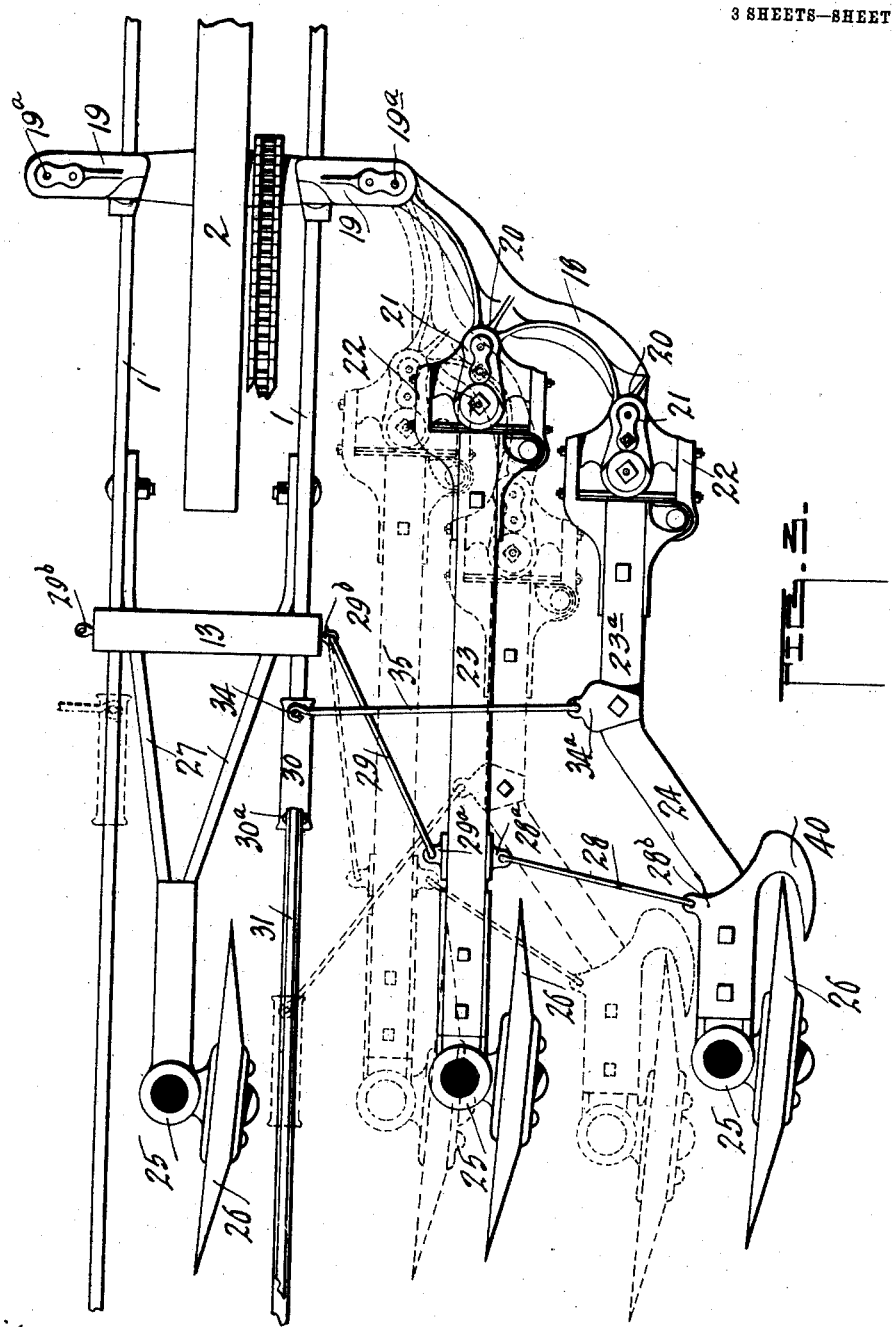

UNITED STATES PATENT OFFICE.

LUTHER E. ROBY, OF PEORIA, ILLINOIS.

SEED-DRILL.

No. 864,562.  Specification of Letters Patent.  Patented Aug. 27, 1907.

Application filed October 22, 1904. Serial No. 229,556.

*To all whom it may concern:*

Be it known that I, LUTHER E. ROBY, a citizen of the United States, residing at Peoria, in the county of Peoria and State of Illinois, have invented certain new and useful Improvements in Seed-Drills; and I do hereby declare that the following is a full, clear, and exact description of the invention, which will enable others skilled in the art to which it appertains to make and use the same.

This invention has reference to drills, and relates particularly to that type of machine known as five-disk drills, and is an improvement upon the machine for which application for Letters Patent was filed on March 4, 1904, bearing Serial Number 196,615.

The improvements herein relate particularly to the draw bar connection with a swingable support, and to the devices adapted to regulate the outward and inward movement of such draw bars.

The invention consists further in the guards or fenders which are supported by the outside draw bars, and to the means for allowing the draw bars to automatically follow the rows of corn stalks.

Further objects and aims will be hereinafter more particularly specified, claimed in the appended claims and illustrated in the accompanying drawings in which:—

Figure 1 is a side elevation of a five-disk drill with my improvements embodied thereon; Fig. 2 is a plan view of the machine seen in Fig. 1 and having the seed-box cut away to disclose certain features beneath; Fig. 3 shows in plan and somewhat enlarged, a series of draw-bars, the manner of holding the same parallel, the mode of swinging them and their support. That part in full lines indicating the disks moved outwardly and the dotted lines showing that the disks have been moved inwardly, and Fig. 4 shows detached and in detail the preferred form of fender for the disks of the outside draw-bars.

Like numerals of reference indicate corresponding parts throughout the figures.

1 denotes corresponding longitudinal frame parts, suitably spaced apart, their forward ends supported upon the front ground wheel 2, and their rear ends upon the rear carrying or truck wheels 3. The rear ends of the frames 1 are coupled to similar couplings 4, and they to each other by the bar 5; and to the couplings 4 the wheels 3 have a suitable swivel connection. Connected to the extreme front ends of the frame parts 1, is a bar or reach 6 extending up a suitable distance and adapted to support or have attached thereto a swingletree (not shown), or other coupling. The reach 6 is braced by the braces 7 which are attached to the reach 6 and brackets 19 attached to the frames 1 as shown. And 8 indicate handles which extend upwardly and rearwardly, their forward lower ends secured to braces 9 attached to and extending laterally from the frames 1.

A seed-box is indicated as 10, supported transversely above the frames 1, by the front brace 11 and the rear braces 12; also the diagonally and longitudinally disposed braces 12$^a$, of which there are two extending from the upper end of the reach 6 to the opposite ends of the seed-box 10, as shown. In Fig. 2 only one of the braces 12$^a$ is seen for the reason, that one half of the seed-box is cut-away, hence the left hand brace 12$^a$ is omitted. The front brace 11 is attached to a cross-plate or frame 13 secured to the frames 1 and serving a further purpose to be described, while the lower ends of the braces 12 are secured to the couplings 4 of the frames 1. Extending through the seed-box is an operating shaft 14 adapted to have connection with suitable seed wheels, not shown, or other feeding devices, adapted to direct grain or seed to suitable conductors which lead to seed tubes, of disks to be described. The shaft 14 is driven from the front ground wheel 2, by means of a sprocket wheel 15 and a chain 16 connecting the sprocket 15 with a sprocket 17 on the shaft 14.

The disks which have been alluded to, consist of a series of five disks, two laterally and vertically movably carried upon opposite sides of the frames 1, and a vertically movable disk carried between the frames 1.

The supports for the disks upon the opposite side of the frames 1, consist of the frames or castings 18, which have a pivoted connection at 19$^a$ with a bracket or other suitable support secured to the frames 1 in line with the axis of the wheel 2. The castings are formed with vertically disposed portions 20, which form pivots for castings 21, adapted to swing horizontally on the said frames 18, and to the said castings are pivoted the castings 22, which are adapted to have vertical swinging movement, and to the said castings 22 are secured the draw bars 23 and 23$^a$; the former disposed adjacent to the outside of the frames 1, and the latter disposed upon the outside of the bars 23, and formed with a crook 24, for the purpose of spacing the disks carried thereby at desirable intervals apart. The connection described between the draw bars and castings 18 forms a swivel connection for the said draw-bars, adapting the same to be raised and lowered, and to swing horizontally on their pivots, the pivoting of the frames 18 allowing the said frames and draw-bars to be swung inwardly and outwardly. The rear ends of the draw-bars support tubular castings or hangers 25 forming seed spouts and journaled to the castings or hangers 25, in a suitable manner, are disk furrow openers 26. The style of the casting 25 and the disk furrow openers 26 are not material, nor the particular manner of conveying seed to the ground through such castings, as any other form of furrow opener designed to be used on a drill, may be used with as good results.

Supported between the frames 1, is a seed spout and a disk furrow opener similar in all respects to those indicated as being carried outside the said frames 1, and the same is vertically movable. It is secured to and supported by the frame on reaches 27, which extend forwardly and are pivotally secured to the frames 1, as seen in the drawings.

It is adapted that the draw-bars 23 and 23$^a$ shall remain parallel to each other at all times, whether the said bars are shifted inwardly or outwardly and to retain the same in a locked relation to each other. The bars 23 and 23$^a$ are coupled in advance of their disks by means of the rod 28 secured to suitable castings 28$^a$ and 28$^b$ attached respectively to the bars 23 and 23$^a$. The bar 23 has in turn, a coupling with the brace or frame 13, by means of a rod 29, which is secured to a casting 29$^a$ attached to the said bar and a swiveled eye 29$^b$, attached at a suitable point to the brace or frame 13. As the bars 23$^a$ are shifted outwardly, it will be seen that the rod 28 will draw the bar 23 out also, the said rod 28 and the rod 29 controlling the movements of the draw-bars 23 and 23$^a$ in their relation to each other, the swivel connection of the eye 29$^b$ adapting the rod 29 to give to the movements of the draw-bars when the same are raised or lowered from the ground, as will be described. The means for shifting the draw-bars will now be described;

On the frame parts 1 are slidably carried sleeves or plates 30, and having a pivotal connection with ears 30$^a$ of the sleeves, are bars or reaches 31, which at their opposite or inner ends, are pivotally connected to the body of a lever 32, the said lever having the usual detent, not shown, operated by a rod and pivoted finger-hold 32$^a$ and 32$^b$, to engage a segment rack 33, supported between the frames 1, whereby, when the lever is adjusted, its position my be locked. The sleeves 30 are each provided with short studs or pins 34 to which are connected the rods or reaches 35, which extend across the rods 29 and the draw-bars 23, and their outer ends connected with a casting 34$^a$, secured to the body of the draw-bar 23$^a$, intermediate their connection with the castings 18 and their disks, as shown. Thus, it will be seen, that, if it is desired to swing the disks outwardly to widen the space between them, the lever 32 is moved so as to cause the reaches 31 to be moved forwardly, imparting a corresponding movement to the sleeves or plates 30. Such movement of the sleeves 30 will cause the rods 35 to be moved forwardly and outwardly, carrying with them the draw-bars 23$^a$, and the draw-bars 23$^a$ will impart a corresponding movement to the draw-bars 23 through the rods 28, each of which carry the disks as described; the castings 18, through the movement of the draw-bars, swinging on their pivots and accommodating themselves to the movement of the draw-bars, while the rods 28 and 29 retain the draw-bars in their relative arrangement, in proper alinement and parallel to each other. To reverse the movement of the draw-bars for contracting the space between the disks, the operation of the lever 32 is reversed, which will impart a movement to the draw-bars, just the reverse to that above described. Both the extreme inner and outer movements being clearly seen in Fig. 3, of the drawings, and may be accomplished by the operator from the rear of the machine, and while the same is in motion.

While the draw-bars are capable of independently following the irregularities of the ground, to allow the disks to accommodate themselves to any unevenness, which is accomplished through the connection described between the draw-bars and frames 18, there is also provided means for raising all the disks simultaneously from the ground and also for applying a yielding pressure upon the said disks. This means consists of a rocking shaft 36, journaled in suitable bearings attached to the braces 12. On the said shaft is carried a series of arms 36$^a$ to the outer ends of which is attached a swiveled block 37$^a$ with which is connected the upper ends of rods 37, which slide freely through said blocks. The rods at their lower ends are secured to eyes or suitable hooks of the bearings of the disks; and 38 denote coil springs which encircle the said rods, for the purpose apparent. To rock the said shaft, a lever 39 is provided, having a rod and pawl connection with a toothed segment supported by one of the braces 12. The lowering of the lever raising the arms 36 and thereby the disks, and the raising of the same lowers the disks and imparts a yielding pressure upon the same. The center disk has connection with the shaft 36, corresponding to the connection of the outside disks with said shaft, to adapt the same to be raised and lowered, but fixed against lateral motion, as will be seen.

41 denotes guards or fenders, consisting of a bar or strap, which are secured at one end at a point 42 to the outer bearing plate of the outer draw-bars 23$^a$ and extending forwardly, upwardly and inwardly are secured at a point 43 to the draw-bars. The said fenders serving to keep all trash and weeds from the disk.

The fenders 41 just described and shown in Figs. 1, 2 and 4 are the preferred form of fender, but in Fig. 3, a modified fender is shown attached to the outer draw-bar 23$^a$; consisting of a guard 40 made integral with the casting 28$^b$ and overlapping the forward portion of the disk 26 as shown.

I have provided for releasing the draw-bars and disks from any positive engagement or connection with means for adjusting them, to permit the same to automatically follow the rows of corn when the machine is in action. For instance, a link or loop 44 is attached to the handle of the lever 32; and it is adapted to slip this link over the finger 32$^b$ which will retain the rod 32$^a$ in a disengaged relation with the rack 33. So that as the machine moves forward, the fenders attached to the draw-bars will engage with the corn-stalks and automatically adapt the disks to the rows of corn, no matter how irregular. The tendency of the draw-bars will be to swing outwardly, hence the fenders will always be in position to guide the direction of the draw-bars and disks, through their engagement with the stalks, as described.

The advantages of the machine described herein are the same as in the machine, upon which application for patent has been made, and above referred to; it being the aim to produce a machine of the character described, wherein the center disk is fixed against lateral motion, and the opposite outside disks, laterally adjustable. The entire series of disks connected with means whereby they may be raised or depressed and each disk independently movable to adapt itself to the irregularities of the ground. The draw-bars supporting the disks being so coupled that the said bars, whether in or out, will always remain parallel with each other and their supporting frame; the arrangement being such that the cutting edges of the disks, no matter in what position the draw-bars are adjusted, will always enter the ground at approximately the same angle, as to change the angle of the disk with the adjustment of the draw-bars, is to destroy the usefulness of the machine and make it practically impossible for the disks to enter the soil.

Having thus fully described my invention, what I claim and desire to secure by Letters Patent of the United States, is:—

1. In a seed drill, a main supporting frame, a pair of draw-bars supporting disk furrow openers, vertically and laterally adjustable upon opposite sides of the frame, coupling rods between the inner draw-bars and the frame and separate coupling rods between the inner and outer draw-bars respectively, and means for shifting the opposite outer draw-bars and thereby shifting the inner opposite draw-bars, substantially as specified.

2. In a seed drill, parallel main frame parts, a disk furrow opener supported between the frame parts and adapted for vertical adjustment only, a pair of draw-bars supporting disk furrow openers disposed upon opposite sides of the frame parts, sleeves slidably carried upon the opposite frame parts, connections between the sleeves and outer draw-bars, separate connections between the outer and inner draw-bars, and means suitably connected with the aforesaid sleeves, whereby the same may be adjusted and thereby adjust the draw-bars, substantially as specified.

3. In a seed drill, a frame, a casting swingably connected with the frame, a pair of draw-bars swiveled to said casting, a rod having its opposite ends pivotally connected to the said draw-bars, a second rod having a pivoted connection with one of said bars and the frame, a horizontally movable member carried on the frame, a rod pivotally connected to said member and the outer draw-bar, and means for shifting the said member, substantially as specified.

4. In a seed drill, a frame, a casting pivotally secured to said frame, a pair of draw-bars swiveled at their forward ends to the casting and extending rearwardly parallel with the frame, furrow openers secured to the rear ends of said bars, a fender having one end secured to a bearing plate of the outside furrow opener and its opposite end secured to the draw-bar at or near its forward end, connections between the draw-bars and the frame, a shifting device, and connections between said shifting device and the outside draw-bar, substantially as specified.

5. In a seed drill, a frame, a draw-bar support pivoted to the frame, a pair of draw-bars swiveled to the said support and carrying furrow openers which are adapted to remain parallel to each other, a connecting device between the draw-bars, a connecting device between the inner bar and frame, a horizontally movable member, a connecting device between the member and outside draw-bar, a lever having a rod and pawl engagement with a toothed segment, connections between the member and lever, means for retaining the lever from engagement with the toothed segment, whereby the draw-bars may swing freely outwardly from the frame, and a fender on the outside draw-bar, substantially and for the purposes specified.

6. In a seed drill, parallel frame supports, a furrow opener supported between the frame supports, frames pivoted oppositely to each other on the said frames, a pair of draw-bars having a swiveled connection with said frames, connections between the draw-bars of each pair and with the parallel supports, sleeves slidably carried by the parallel frames, connections between the said sleeves and outside draw-bars, means for shifting the sleeves and thereby moving the draw-bars simultaneously inwardly or outwardly, and means for raising or depressing the series of draw-bars and center furrow openers, substantially as specified.

7. In a seed drill, a frame, a casting pivotally connected to the frame, a draw-bar connected for horizontal and vertical movement with said casting, a disk furrow opener supported by the opposite end of the draw-bar, means for shifting the draw-bar inwardly and outwardly, means for raising or lowering the said draw-bar, and a fender consisting of a bar suitably attached at one end to the bearing plate of the disk and extending forwardly and upwardly is secured to the draw-bar at or near its outer end, substantially as specified.

8. In a grain drill, a draw-bar pivotally supported at its forward end to adapt it to have vertical and horizontal swinging movement, means for swinging said bar horizontally, means for raising or depressing the same, a tubular disk hanger connected to the rear end of the draw-bar, a disk connected to said hanger with its concave face adjacent thereto, and a fender secured at one end to the outside bearing of the disk and extending forwardly, upwardly and inwardly with its front end connected to the draw-bar, for the purpose described.

9. In a grain drill, a supporting frame, a pair of draw-bars on each side of the frame and pivotally connected at their forward ends to said frame, means connecting the draw-bars of each pair in series, means for raising or lowering each pair of draw-bars simultaneously, disk hangers and disks connected to the rear ends of said draw-bars, and fenders secured to the outside disk hangers at each side of the frame, and extending forwardly, upwardly and inwardly, for the purpose described.

10. In a grain drill, the combination of a support pivoted at one end to adapt it to have a horizontal swinging movement, draw-bars supporting disk hangers and disks and pivoted to said support, an equalizing device for connecting said draw-bars in series for retaining them parallel with each other at all times, means for oscillating said support and thereby the draw-bars, and fenders secured to the disk hangers of the outside draw-bars and extending forwardly, upwardly and inwardly, for the purpose described.

11. In a grain drill, a draw-bar, a disk hanger and disk connected thereto, and a fender secured to the disk hanger extending forwardly, upwardly and inwardly and secured at its forward end to the draw-bar, for the purpose described.

12. In a grain drill, the combination of a series of draw-bars adapted to have vertical and horizontal swinging movement, disk hangers and disks connected to each of said draw-bars, means for retaining the said bars parallel with each other in their horizontal movement, and fenders secured to the disk hangers at each side extending forwardly, upwardly and inwardly, for the purpose described.

13. In a grain drill, the combination of a series of parallel retained draw-bars, a disk hanger and disk connected to each of said draw-bars, and fenders secured to the disk hangers at each side extending forwardly, upwardly and inwardly, for the purpose described.

14. In a grain drill, the combination of a series of draw-bars pivotally supported at their forward ends to adapt them to have horizontal and vertical movement, a connection between the said draw-bars to retain them at all times parallel with each other, a lever having a rod and pawl engagement with a toothed segment, connections between said lever and the draw-bars, and means for retaining the lever from engagement with the toothed segment, whereby the draw-bars may swing freely outwardly.

15. In a grain drill, the combination of a series of draw-bars pivotally supported at their forward ends to adapt them to have horizontal and vertical movement, a connection between the said draw-bars to retain them at all times parallel with each other, a lever having a rod and pawl engagement with a toothed segment, connections between said lever and the draw-bars, means for retaining the lever from engagement with the toothed segment, whereby the draw-bars may swing freely outwardly, and fenders connected to the outside draw-bars.

16. In a grain drill, the combination of a series of draw-bars adapted to have vertical and horizontal swinging movement, disk hangers and disks connected to each of said draw-bars, means for retaining the said bars parallel with each other in their horizontal movement, and fenders secured to the outside draw-bars of the series and overlapping the disks supported thereby.

17. In a grain drill, a main supporting frame, a pair of draw-bars upon each side of the main frame supporting disk furrow openers, pivotally hung at their forward ends on said frame to adapt them to have horizontal movement, coupling rods between the inner draw-bars and the frame and separate coupling rods between the inner and outer draw-bars respectively, and means for shifting the opposite outer draw-bars and thereby shifting the inner opposite draw-bars, substantially as specified.

In testimony whereof I affix my signature, in presence of two witnesses.

LUTHER E. ROBY.

Witnesses:
H. V. GIBSON,
CHAS. W. LA PORTE.